United States Patent
Pecen et al.

(10) Patent No.: US 12,238,202 B2
(45) Date of Patent: Feb. 25, 2025

(54) SYSTEMS AND METHODS FOR CONTINUOUS GENERATION AND MANAGEMENT OF EPHEMERAL CRYPTOGRAPHIC KEYS

(71) Applicant: Qwerx Inc., Vienna, VA (US)

(72) Inventors: Mark Pecen, Waterloo, CA (US); John Ellingson, Haymarket, VA (US)

(73) Assignee: Qwerx Inc., Vienna, VA (US)

(*) Notice: Subject to any disclaimer, the term of this patent is extended or adjusted under 35 U.S.C. 154(b) by 0 days.

(21) Appl. No.: 18/110,180

(22) Filed: Feb. 15, 2023

(65) Prior Publication Data

US 2024/0235815 A1 Jul. 11, 2024

Related U.S. Application Data

(60) Provisional application No. 63/438,186, filed on Jan. 10, 2023.

(51) Int. Cl.
*H04L 29/06* (2006.01)
*H04L 9/06* (2006.01)

(52) U.S. Cl.
CPC .......... *H04L 9/0662* (2013.01); *H04L 9/0631* (2013.01)

(58) Field of Classification Search
None
See application file for complete search history.

(56) References Cited

U.S. PATENT DOCUMENTS

| | | |
|---|---|---|
| 4,405,829 A | 9/1983 | Rivest et al. |
| 4,649,233 A | 3/1987 | Bass et al. |
| 5,651,064 A | 7/1997 | Newell |
| 5,729,608 A | 3/1998 | Janson |
| 5,987,483 A | 11/1999 | Edelkind et al. |
| 6,055,637 A | 4/2000 | Hudson et al. |
| 6,295,541 B1 | 9/2001 | Bodnar et al. |

(Continued)

FOREIGN PATENT DOCUMENTS

| | | |
|---|---|---|
| KR | 20180108910 A | 10/2018 |
| WO | 2012089967 A1 | 7/2012 |

(Continued)

OTHER PUBLICATIONS

Luo, Shoufu et al. Fingerprinting Cryptographic Protocols with Key Exchange Using an Entropy Measure. 2018 IEEE Security and Privacy Workshops (SPW). https://ieeexplore.ieee.org/stamp/stamp.jsp?tp=&arnumber=8424648 (Year: 2018).*

(Continued)

*Primary Examiner* — Jeremiah L Avery
(74) *Attorney, Agent, or Firm* — Gesmer Updegrove LLP (57) ABSTRACT

A cryptographic management key system is disclosed for providing secure communication in a cryptographic system. The cryptographic key management system includes a plurality of communication apparatuses under the control of a common control console, each communication apparatus being in communication with at least one source of dynamic random or pseudo-random information via the common control console, and communication paths among the plurality of communication apparatuses, said communication paths including a control plane, a random information plane and a data plane.

22 Claims, 6 Drawing Sheets

(56) References Cited

U.S. PATENT DOCUMENTS

| | | |
|---|---|---|
| 8,321,670 B2 | 11/2012 | Lior et al. |
| 8,510,565 B2 | 8/2013 | Tie et al. |
| 8,817,985 B2 | 8/2014 | Fukuda |
| 8,855,312 B1 | 10/2014 | Hodgman et al. |
| 8,964,947 B1 | 2/2015 | Noolu et al. |
| 9,021,269 B2 | 4/2015 | Spilman |
| 9,178,699 B2 | 11/2015 | Lambert et al. |
| 9,432,198 B2 | 8/2016 | Falk et al. |
| 9,722,803 B1 | 8/2017 | Ellingson et al. |
| 9,813,245 B2 | 11/2017 | Le Saint et al. |
| 9,980,140 B1 | 5/2018 | Spencer et al. |
| 10,015,153 B1 | 7/2018 | Dotan |
| 10,021,100 B2 | 7/2018 | Ellingson et al. |
| 10,057,269 B1 | 8/2018 | Ellingson |
| 10,097,344 B2 | 10/2018 | Davis |
| 10,122,699 B1 | 11/2018 | Ellingson et al. |
| 10,149,156 B1 | 12/2018 | Tiku et al. |
| 10,541,989 B2 | 1/2020 | Ellingson et al. |
| 10,542,002 B2 | 1/2020 | Ellingson et al. |
| 10,771,243 B1* | 9/2020 | Pasquali ................ H04L 67/55 |
| 11,196,720 B2* | 12/2021 | Thompson ............ H04L 9/0894 |
| 11,670,188 B2* | 6/2023 | Aharonson ............ G09B 15/00 |
| | | 84/477 R |
| 2001/0044786 A1 | 11/2001 | Ishibashi |
| 2002/0138761 A1 | 9/2002 | Kanemaki et al. |
| 2003/0084287 A1 | 5/2003 | Wang et al. |
| 2003/0182327 A1 | 9/2003 | Ramanujam et al. |
| 2004/0067736 A1 | 4/2004 | Kamma |
| 2004/0131187 A1 | 7/2004 | Takao |
| 2004/0167804 A1 | 8/2004 | Simpson et al. |
| 2004/0172300 A1 | 9/2004 | Mihai et al. |
| 2004/0172423 A1 | 9/2004 | Kaasten et al. |
| 2005/0187966 A1 | 8/2005 | Lino |
| 2005/0208940 A1 | 9/2005 | Takase et al. |
| 2005/0216769 A1 | 9/2005 | Matsuoka |
| 2006/0010182 A1 | 1/2006 | Altepeter et al. |
| 2006/0010183 A1 | 1/2006 | Rabin et al. |
| 2006/0053285 A1 | 3/2006 | Kimmel et al. |
| 2006/0075234 A1 | 4/2006 | You et al. |
| 2006/0080545 A1 | 4/2006 | Bagley |
| 2006/0087999 A1 | 4/2006 | Gustave et al. |
| 2006/0133613 A1 | 6/2006 | Ando et al. |
| 2006/0136702 A1 | 6/2006 | Vantalon et al. |
| 2006/0147043 A1 | 7/2006 | Mann et al. |
| 2006/0161775 A1 | 7/2006 | O'Brien et al. |
| 2007/0005985 A1 | 1/2007 | Eldar et al. |
| 2007/0022302 A1 | 1/2007 | Richards, Jr. et al. |
| 2007/0186115 A1 | 8/2007 | Gao et al. |
| 2007/0256118 A1 | 11/2007 | Nomura et al. |
| 2008/0022091 A1 | 1/2008 | Deschpande et al. |
| 2008/0086646 A1 | 4/2008 | Pizano |
| 2008/0209214 A1 | 8/2008 | Schrijen et al. |
| 2008/0235768 A1 | 9/2008 | Walter et al. |
| 2008/0301228 A1 | 12/2008 | Flavin |
| 2008/0313698 A1 | 12/2008 | Zhao et al. |
| 2008/0313723 A1 | 12/2008 | Naono et al. |
| 2009/0006850 A1 | 1/2009 | Birger et al. |
| 2009/0135725 A1 | 5/2009 | Tanaka et al. |
| 2009/0161876 A1 | 6/2009 | Sherkin |
| 2009/0199009 A1 | 8/2009 | Chia et al. |
| 2009/0282467 A1 | 11/2009 | Schenk |
| 2009/0287921 A1 | 11/2009 | Zhu et al. |
| 2010/0042833 A1 | 2/2010 | Platt |
| 2010/0062758 A1 | 3/2010 | Proctor |
| 2010/0104102 A1 | 4/2010 | Brown et al. |
| 2010/0228981 A1 | 9/2010 | Yao |
| 2010/0250952 A1 | 9/2010 | Pang et al. |
| 2010/0279611 A1 | 11/2010 | Kumazawa |
| 2010/0299308 A1 | 11/2010 | Prasad et al. |
| 2011/0010543 A1 | 1/2011 | Schmidt et al. |
| 2011/0138179 A1 | 6/2011 | Jiang et al. |
| 2011/0138719 A1 | 6/2011 | Gosling et al. |
| 2011/0154037 A1 | 6/2011 | Orre et al. |
| 2011/0197064 A1 | 8/2011 | Garcia Morchon |
| 2011/0202755 A1 | 8/2011 | Orsini et al. |
| 2012/0011360 A1 | 1/2012 | Engels et al. |
| 2012/0033803 A1* | 2/2012 | Huang .................. H04L 9/0668 |
| | | 380/28 |
| 2012/0093311 A1 | 4/2012 | Nierzwick et al. |
| 2012/0106735 A1 | 5/2012 | Fukuda |
| 2012/0167169 A1 | 6/2012 | Ge |
| 2012/0170751 A1 | 7/2012 | Wurm |
| 2012/0243679 A1 | 9/2012 | Obana |
| 2013/0276092 A1 | 1/2013 | Sun et al. |
| 2013/0035067 A1 | 2/2013 | Zhang et al. |
| 2013/0046972 A1 | 2/2013 | Campagna et al. |
| 2013/0097117 A1 | 4/2013 | Lasky et al. |
| 2013/0152160 A1 | 6/2013 | Smith et al. |
| 2013/0182848 A1 | 7/2013 | Sundaram et al. |
| 2013/0232551 A1 | 9/2013 | Du et al. |
| 2013/0243194 A1 | 9/2013 | Hawkes et al. |
| 2014/0013108 A1 | 1/2014 | Pellikka et al. |
| 2014/0057601 A1 | 2/2014 | Michau et al. |
| 2014/0162601 A1 | 6/2014 | Kim et al. |
| 2014/0164768 A1 | 6/2014 | Kruglick |
| 2014/0164776 A1 | 6/2014 | Hook et al. |
| 2015/0013015 A1 | 1/2015 | Zheng et al. |
| 2015/0039651 A1 | 2/2015 | Kinsely et al. |
| 2015/0058841 A1* | 2/2015 | Krempa ................ G06F 9/45558 |
| | | 718/1 |
| 2015/0101037 A1 | 4/2015 | Yang et al. |
| 2015/0106893 A1 | 4/2015 | Du et al. |
| 2015/0220726 A1 | 8/2015 | Huo |
| 2015/0222632 A1 | 8/2015 | Ichijo et al. |
| 2015/0237026 A1 | 8/2015 | Kumar |
| 2015/0281199 A1 | 10/2015 | Sharma |
| 2015/0286719 A1 | 10/2015 | Sampathkumaran |
| 2015/0372811 A1 | 12/2015 | Le Saint et al. |
| 2016/0063466 A1 | 3/2016 | Sheridan et al. |
| 2016/0065370 A1 | 3/2016 | Le Saint et al. |
| 2016/0099901 A1 | 4/2016 | Allen et al. |
| 2016/0099922 A1 | 4/2016 | Dover |
| 2016/0156614 A1 | 6/2016 | Jain et al. |
| 2016/0182497 A1 | 6/2016 | Smith |
| 2016/0197706 A1 | 7/2016 | Lester et al. |
| 2016/0260169 A1 | 9/2016 | Arnold et al. |
| 2016/0261690 A1 | 9/2016 | Ford |
| 2016/0308858 A1* | 10/2016 | Nordstrom ............ H04L 9/3228 |
| 2016/0337326 A1 | 11/2016 | O'Hare et al. |
| 2016/0342394 A1* | 11/2016 | Tsirkin ................ H04L 9/002 |
| 2017/0034167 A1* | 2/2017 | Figueira ................ H04L 63/061 |
| 2017/0201380 A1 | 7/2017 | Schaap et al. |
| 2017/0243212 A1 | 8/2017 | Castinado et al. |
| 2017/0324548 A1 | 11/2017 | Anshel et al. |
| 2018/0052662 A1* | 2/2018 | Dale ....................... G06F 7/582 |
| 2018/0077156 A1 | 3/2018 | Ellingson et al. |
| 2018/0131526 A1 | 5/2018 | Ellingson et al. |
| 2018/0343259 A1 | 11/2018 | Ellingson |
| 2018/0367533 A1 | 12/2018 | Ellingson et al. |
| 2019/0036899 A1 | 1/2019 | Ellingson et al. |
| 2019/0149552 A1 | 5/2019 | Ellingson |
| 2020/0067927 A1 | 2/2020 | Ellingson et al. |
| 2020/0111091 A1 | 4/2020 | Ellingson |
| 2020/0235914 A1* | 7/2020 | Zhang .................. H04L 9/0869 |
| 2020/0287716 A1* | 9/2020 | Zitlaw ....................... H04L 9/14 |
| 2020/0301670 A1 | 9/2020 | Thornton et al. |
| 2020/0322148 A1* | 10/2020 | McGough ............ H04L 9/3234 |
| 2021/0211271 A1* | 7/2021 | Kuang .................. H04L 9/065 |
| 2021/0373854 A1* | 12/2021 | Hill ........................ G06F 7/588 |
| 2022/0126210 A1* | 4/2022 | Kumar .................. G06T 15/005 |
| 2022/0158826 A1* | 5/2022 | Gordon .................. H04L 9/0869 |
| 2022/0271927 A1* | 8/2022 | Stayskal ................ H04L 9/0852 |
| 2022/0391174 A1 | 12/2022 | Kleijn et al. |
| 2023/0023529 A1* | 1/2023 | Jenkins ................ H04L 9/0631 |
| 2023/0048912 A1* | 2/2023 | Gasti .................. G06F 21/6245 |
| 2023/0155825 A1* | 5/2023 | Wu ........................ H04L 9/3231 |
| | | 380/44 |
| 2023/0179411 A1* | 6/2023 | Van Loon ............... G06F 7/588 |
| | | 380/46 |
| 2023/0180017 A1* | 6/2023 | Gadalin ................ H04W 16/14 |
| | | 370/328 |

(56) References Cited

U.S. PATENT DOCUMENTS

2024/0012619 A1    1/2024   Ellingson et al.
2024/0333501 A1*  10/2024   Durham .............. G06F 21/6209

FOREIGN PATENT DOCUMENTS

| WO | 2018049116 A1 | 3/2018 |
| WO | 2018194801 A1 | 10/2018 |
| WO | 2018222281 A1 | 12/2018 |
| WO | 2019126823 A1 | 6/2019 |
| WO | 2019200215 A1 | 10/2019 |
| WO | 2020092886 A1 | 5/2020 |
| WO | 2024151476 A1 | 7/2024 |

OTHER PUBLICATIONS

Kazumori, Kohel et al. A Ternary Fuzzy Extractor for Efficient Cryptographic Key Generation. 2019 IEEE 49th International Symposium on Multiple-Valued Logic (ISMVL). https://ieeexplore.ieee.org/stamp/stamp.jsp?tp=&arnumber=8758710 (Year: 2019).*

Taneja, Sachin; Alioto, Massimo. Fully Synthesizable All-Digital Unified Dynamic Entropy Generation, Extraction, and Utilization Within the Same Cryptographic Core. IEEE Solid-State Circuits Letters, vol. 3. https://ieeexplore.ieee.org/stamp/stamp.jsp?tp=&arnumber=9199880 (Year: 2020).*

Communication Relating to the Results of the Partial International Search issued by the International Search Authority (the European Patent Office) in related international application No. PCT/US2024/010399 on Apr. 26, 2024, 2 pages.

Cheng Haosu et al., "OSCO: An Open Security-Enhanced Compatible OpenFlow Platform," Jun. 13, 2018, SAT 2015 18th International Conference, Austin, TX, USA, Sep. 24-27, 2015; [Lecture Notes in Computer Science; Lect. Notes Computer], Springer, Berlin, Heidelberg, pp. 66-77, XP047475241, ISBN: 978-3-540-74549-5, retrieved on Jun. 13, 2018] Sections 1-4, Figures 1-5.

Sharma purva et al., "Quantum Key Distribution Secured Optical Networks: A Survey," IEEE Open Journal of the Communications Society, IEEE, vol. 2, Aug. 23, 2021, pp. 2049-2083, XP011877197, DOI: 10.1109/OJCOMS.2021.3106659, retrieved on Sep. 3, 2021, sections III, IV, V, figures 12-15, 17, 18.

Piotr K Tysowski et al., "The Engineering of a Scalable Multi-Site Communications System Utilizing Quantum Key Distribution (QKD)," arxiv.org, Cornell University Library, 201 Olin Library Cornell University Ithaca, NY 14853, Dec. 7, 2017, XP080845597, DOI: 10.1088/2058-9565/AA9A5D.

Amyx, Managed PKI Certificates: One step at a time toward security the IoT, Unshackle the Internet of Things, TechBeacon, 14 pages, 2016.

Bocek, Venafi Blog, Attack on Trust Threat Bulletin: Sony Breach Leaks Private Keys, Leaving Door Open, |Dec. 4, 2014, retrieved from https://www.venafi.com/blog/attack-on-trust-threat-bulletin-sony-breach, 7 pages.

Chiba et al., Dynamic Authorization Extensions to Remote Authentication Dial in User Service (RADIUS), Network Working Group, Microsoft Corporation, RFC 5176, Jan. 2008, 35 pages.

Cisco, Dynamic Shared Secret for the Cisco CMTS Routers, Feb. 14, 2008, Cisco IOS CMTS Software Configuration Guide, 32 pages.

Cnodder et al., RADIUS Dynamic Authorization Server MIB, Network Working Group, Cisco Systems, Inc., RFC 4673, Sep. 2006, 25 pages.

Commission on Enhancing National Cybersecurity, Report on Securing and Growing the Digital Economy, 100 pages, Dec. 1, 2016.

Cremers et al., A Family of Multi-Party Authentication Protocols, 12 pages, 2006.

DBIR, 2016 Data Breach Investigations Report—89% of breaches had a financial or espionage motive, Verizon 2016 Data Breach Investigations Report, pp. 1-85, 2016.

Dierks et al., The Transport Layer Security (TLS) Protocol Version 1.1, Network Working Group, https://tools.ietf.org/html/rfc4346?cm_mc_uid=55413578387314706858380&cm_mc_sid_50200000=14 72153170, pp. 1-174, Apr. 2006.

Dr. Dobbs, The Book Cipher Algorithm, retrieved from http://www.drdobbs.com/security/the-book-cipher-algorithm/210603676 on Sep. 24, 2008, 5 pages.

Glover, PC1 3.1: Stop Using SSL and Outdate TLS Immediately, http://blog.securitymetrics.com/2015/04/pci-3-1-ssl-and-tls.html, pp. 1-6, Aug. 25, 2016.

Grass et al., Draft NIST Special Publication 800-63B Digital Authentication Guideline, Authentication and Lifecycle Management, National Institute of Standards and Technology, U.S. Department of Commerce, pp. 1-48, Nov. 18, 2016.

Hosseinkhani et al., Using image as cipher key in AES, IJCSI International Journal of Computer Science Issues, vol. 9, Issue 2, No. 2, ISSN (Online): 1694-0814, pp. 538-544, Mar. 2012.

IBM Knowledge Center, RSCS Dynamic Authorization Server Virtual Machine, Version 6.3.0, 2 pages, 2023.

IBM, The Secure Sockets Layer and Transport Layer Security, Verification of X.509 Public Key Certificates for Secure Communications, http://www.ibm.com/developerworks/library/ws-ssi-security, pp. 1-48, Jun. 6, 2012.

International Preliminary Report on Patentability issued by the International Bureau of WIPO in related International Application No. PCT/US2017/050614 on Mar. 12, 2019, 9 pages.

International Preliminary Report on Patentability issued by the International Bureau of WIPO in related International Application No. PCT/US2018/027316 on Dec. 3, 2019, 9 pages.

International Preliminary Report on Patentability issued by the International Bureau of WIPO in related International Application No. PCT/US2018/024521 dated Oct. 22, 2019, 7 pages.

International Preliminary Report on Patentability issued by the International Bureau of WIPO in related International Application No. PCT/US2018/067444 dated Jun. 30, 2020, 6 pages.

International Preliminary Report on Patentability issued by the International Bureau of WIPO in related International Application No. PCT/US2019/059369 dated Apr. 27, 2021, 5 pages.

International Preliminary Report on Patentability issued by the International Bureau of WIPO in related International Application No. PCT/US2019/027161 dated Oct. 13, 2020, 5 pages.

International Search Report and Written Opinion issued by the International Searching Authority, the Korean Intellectual Property Office, in related International Application No. PCT/US2019/059369 dated Feb. 24, 2020, 9 pages.

International Search Report and Written Opinion issued by the International Searching Authority, the Korean Intellectual Property Office, in related International Application No. PCT/US2019/027161 dated Aug. 13, 2019, 8 pages.

International Search Report and Written Opinion issued by the International Searching Authority (the European Patent Office) in related international application No. PCT/US2024/010399 on Jun. 17, 2024, 14 pages.

International Search Report and Written Opinion issued by the Korean Intellectual Property Office, as the International Searching Authority, in related International Application No. PCT/US2018/024521 dated Jul. 12, 2018, 9 pages.

International Search Report and Written Opinion issued by the Korean Intellectual Property Office, as the International Searching Authority, in related International Application No. PCT/US2018/067444 dated Apr. 5, 2019, 9 pages.

International Search Report and Written Opinion of the International Searching Authority, the Korean Intellectual Property Office, issued in related International Application No. PCT/US2017/050614 on Nov. 16, 2017, 11 pages.

International Search Report and Written Opinion of the International Searching Authority, the Korean Intellectual Property Office, issued in related International Application No. PCT/US2018/043634 on Oct. 26, 2018, 11 pages.

International Search Report and Written Opinion of the International Searching Authority, the Korean Intellectual Property Office, issued in related International Application No. PCT/US2018/027316 on Aug. 30, 2018, 11 pages.

(56) References Cited

OTHER PUBLICATIONS

Jarmoc, Transitive Trust and SSL/TLS Interception Proxies, SecureWorks, https://www.secureworks.com/research/transitive-trust, pp. 1-21, Mar. 21, 2012.

Juniper Networks, Inc., Enabling IMS AAA Dynamic Authorization, 1999-2010, 5 pages.

Kin-Wah, et al., On the Feasibility and Efficacy of Protection Routin in IP Networks, University of Pennsylvania Scholarly Commons, Departmental Papers, Department of Electrical & Systems Engineering, Proceedings of the IEEE 2010 Conference on Computer Communications (INFOCOM 2010), San Diego, CA, Mar. 2010, Dec. 10, 2009, 11 pages.

Levi et al., An efficient, dynamic and trust preserving public key infrastructure, IEEE.org, IEEE Xplore Digital Library, Aug. 6, 2002, 3 pages.

Lim et al., A Dynamic Key Infrastructure for GRID, Information Security Group, 10 pages, 2005.

Meyburgh, Dynamic Distributed Key Infrastructure DDKI, Tunnel Project with GateKeeper and KeyVault, A00214314, (COMP 8045 & COMP 8046), 47 pages, 2017.

Moreau, Why Should We Look for Alternatives to the Public Key Infrastructure (PKI) Model?, CONNOTECH Experts-conseils Inc., Aug. 1999, Quebec, Canada, 4 pages.

Palo Alto Networks, Government Endpoint, Use Case, 6 pages, 2018.

Pansa et al., Web Security Improving by Using Dynamic Password Authentication, 2011 International Conference on Network and Electronics Engineering, pp. 32-36, 2011.

RSA, Global Security Chiefs Offer Five Recommendations to Overhaul Outdated Information Security Processes, http://www.rsa.com/en_us/company/newsroom/global-security-chiefs-offer-five-recommendations-to-overhaul, pp. 1-11, Dec. 10, 2013.

RSA, Two-Factor Authentication is a Must for Mobile, https://blogs.rsa.com/two-factor-authentication-is-a-must-for-mobile, www.rsa.com, pp. 1-7, Aug. 24, 2016.

Salem et al., The Case for Dynamic Distribution for PKI-based Vanets, International Journal of Computer Networks & Communications (IJCNC), vol. 6, No. 1, pp. 61-78, Jan. 2014.

Stack Exchange, What can an attacker do with a stolen SSL private key? What should the web admin do? Retrieved from http://security.stackexchange.com/questions/16685/what-can-an-attacker, 2012.

Wang et al., ID-Based Authenticated Multi-Party Key Agreement Protocol to Multimedia Applications Systems, 2008 International Conference on Computer Science and Software Engineering, 2008 IEEE, 4 pages.

Whitenoise, Unclassified story of Whitenoise Super Key Encryption and Dynamic Identity Verification and Authentication, 9 pages, 2024.

Wikipedia, Dynamic SSL, https://en.wikipedia.org/wiki/Dynamic_SSL_Dynamic SSL—Wikipedia, the free encyclopedia, pp. 1-4, Aug. 25, 2016.

Wikipedia, Man-in-the-middle attack, https://en.wikipedia.org/w/index.php?title-Man-in-the-middle_attach&oldid=753645501, 5 pages, Dec. 8, 2016.

Wnlabs, One time pad security, retrieved from http://wnlabs.com/solution.html on Jun. 13, 2017, 2 pages.

\* cited by examiner

SYSTEMS AND METHODS FOR CONTINUOUS GENERATION AND MANAGEMENT OF EPHEMERAL CRYPTOGRAPHIC KEYS

PRIORITY

The present application claims priority to U.S. Provisional Patent Application No. 63/438,186 filed Jan. 10, 2023, the disclosure of which is hereby incorporated by reference in its entirety.

BACKGROUND

The invention generally relates to data protection, cryptography and security architecture, and relates in particular to the control of cryptographic systems such as advanced encryption standard (AES) 256 bit encryption (AES-256).

The encryption standard AES-256 first appeared in 2001 in commercial implementations, and has long been accepted as a strong encryption standard by the public and private sector. As with other symmetric key modalities, it is inherently stronger than similar asymmetric key modalities. The standard however, has previously retained the inherent vulnerabilities of symmetric keys, specifically that the shared and stored key need to be protected from compromise. The cryptographic system itself is strong, but if the keys are stolen or obtained by social engineering, the security can be broken without breaking the cryptosystem itself.

Although the standard is highly effective in hiding information from potential attackers, an apparent weakness is the use of a shared secret key, which is common to both symmetric and asymmetric cryptosystems in use at present. This means that the primary attack vector to AES-256 is not breaking the cryptography, as this would require a very sophisticated supercomputer to spend $2.29 \times 10^{38}$ years. The more important issue is that keys can be stolen via the path of social engineering.

This is why attacks at present tend to avoid addressing the cryptographic primitives themselves, because these are considered highly effective, and generally a waste of time to attack directly, as they are likely to require large amounts of computing power and time. The modern approach for the 2020s is to steal the keys in one manner or another, e.g., social engineering or compensating a data center employee to deliver keys and certificates illegally. Because of the lack of trace records in most cases, many such breaches may not be detected for relatively long periods of time. Stolen credentials have been the cause of some of the costliest data breaches in recent years such as breaches at Equifax Inc., Yahoo! Inc. and the U.S. government. Further to this, it is estimated that stolen credentials have been used in at least 85% of recent phishing attacks, as social engineering attacks tend to be far simpler than attacks directly to the cryptosystem.

There remains a need therefore, for cryptographic systems that are better designed to reduce vulnerabilities and thwart attack.

SUMMARY

In accordance with an aspect, the invention provides a cryptographic management key system for providing secure communication in a cryptographic system. The cryptographic key management system includes a plurality of communication apparatuses under the control of a common control console, each communication apparatus being in communication with at least one source of dynamic random or pseudo-random information via the common control console, and communication paths among the plurality of communication apparatuses, said communication paths including a control plane, a random information plane and a data plane.

In accordance with another aspect, the invention provides a key generation system for continuous generation of disposable cryptographic keys for an underlying cryptosystem. The key generation system includes at least one source of raw entropy that provides the source of information to generate random information or pseudo-random information, an entropy multiplexer that combines entropy from at least one entropy source; a key material loader that formats raw key material and loads it into a database, a key material database that stores entropy information that can be accessed randomly via index positions and its information shuffled relative to any other indexed position in the database, a key material management and synchronization system that performs as a system controller of a network system, a key material quantizer that quantizes the raw entropy from the database and formats it into an appropriate cryptographic key, and a payload data quantizer that formats and unformats payload data to and from the encryption and decryption units.

In accordance with a further aspect, the invention provides a method for producing ephemeral, disposable cryptographic keys in an underlying cryptographic system. The method includes selecting one or more sources of random information or pseudo-random information, multiplexing the random information or pseudo-random information in a pre-defined or arbitrary manner, formatting the random information or pseudo-random information for storage in a random access database, shuffling and/or re-indexing the information in the random-access database relative to its index positions, formatting the shuffled random information from the database to form a key and an initialization vector, sending the formatted key material to the cryptosystem; selecting the format for upper layer payload data packets, disassembling the payload packet into smaller packets that can be transported by the cryptosystem, and assembling data payload packets arriving from the cryptosystem into decrypted payload packets that are then passed to the upper layers of the system.

BRIEF DESCRIPTION OF THE DRAWINGS

The following description may be further understood with reference to the accompanying drawings in which.

The drawings are shown for illustrative purposes only.

DETAILED DESCRIPTION

In accordance with various aspects, the invention provides a system and method with an apparatus for 1) further improving and securing underlying cryptosystems and 2) eliminating the attack vector associated with stolen keys and other related credentials such as certificates.

Predictability and determinability of components of the entire encryption method provide pathways of attack. By eliminating components such as the exchange or storage of actual keys and the predictable use of known or predictable key or bit size, these pathways are reduced or eliminated entirely. The introduction of variability in the remaining system components increases the level of difficulty facing the attacker. Although the below example uses the AES-256 cryptosystem, systems and methods of the invention apply to the construction of keys of many other underlying cryptosystems.

Disclosed herein is an approach that eliminates the storage and exchange of keys while retaining the strength of symmetric and asymmetric key cryptosystems in accordance with an aspect of the present invention. The system in accordance with an aspect has the following properties. First, the keys produced are built from ephemeral key material, basically raw entropy, and are therefore dynamic and only exist when being used. Second, the keys are never stored anywhere. Only raw information from which keys are assembled in the moment of their use is stored. That information is of no use to an adversary while in storage. These can be viewed as disposable crypto keys. Third, another property is the introduction of the time element, and specifically the ability to assemble and use keys from raw entropy, and which may be changed periodically, e.g., many times per second. This further assures against the so-called "harvest and decrypt" attack where the attacker simply saves the encrypted data stream and attempts to decrypt it over time. Fourth, the keys themselves are never exchanged and only information that enables identical keys to be assembled many times a second is exchanged and that information is of a nature that it can be exchanged in the clear. Fifth. the keys are never exposed to an adversary and never exist where they must be protected. Because they can change many times a second and multiple keys can be used for both authentication and encryption, the challenge for an attacker is of such complexity that it is beyond solution in the life of the universe.

By stripping away the storage and exchange of keys, the modality is simpler and lighter weight than the current modality and easier to implement, but significantly less vulnerable to attack. The approach addresses certain attack vectors that have become common in recent years. The novelty of the current invention is in the removal of inherent vulnerabilities in the current architecture and method of application of underlying cryptographic system.

Figure 1:
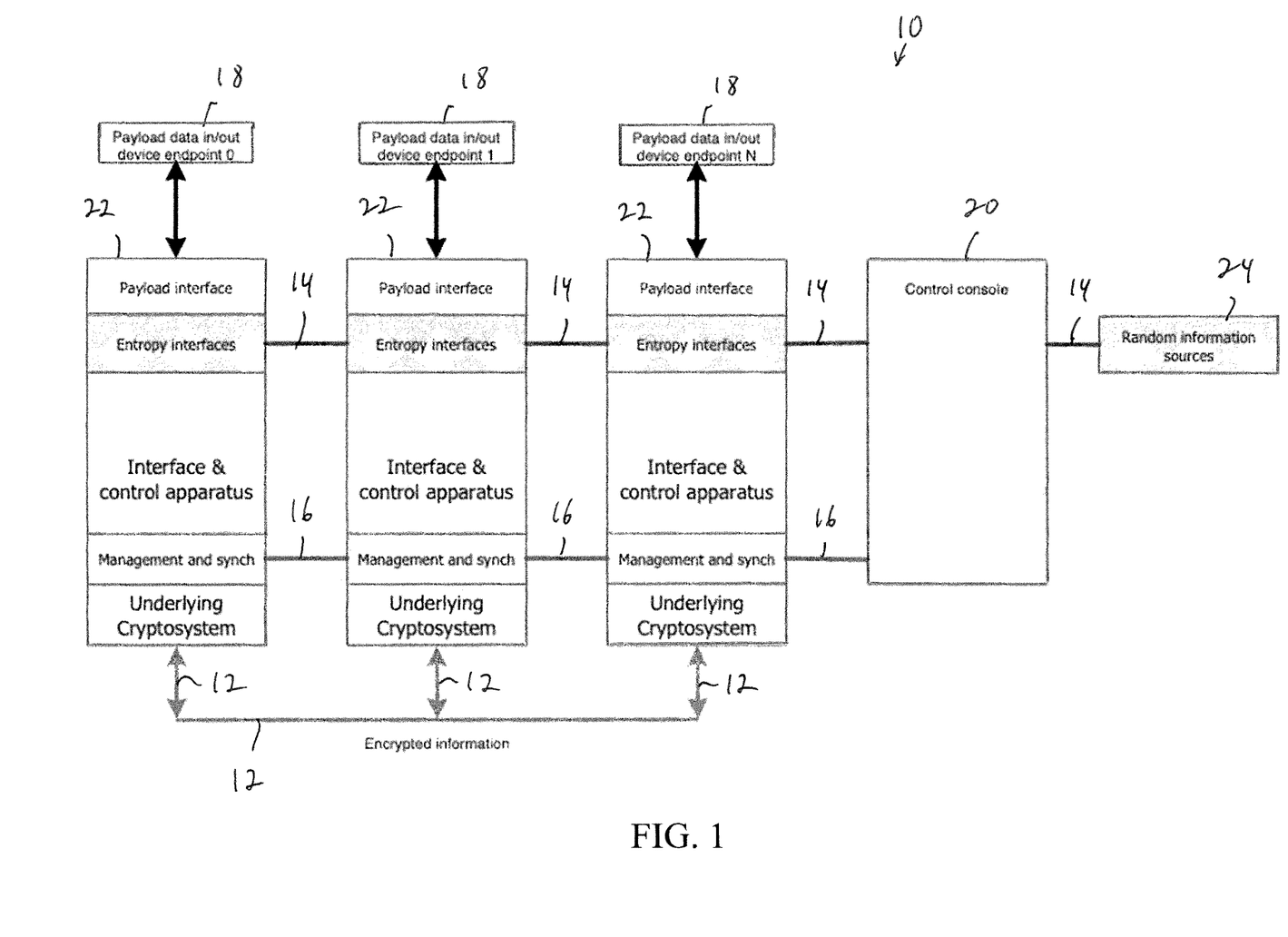
FIG. 1 shows an illustrative diagrammatic functional view of a system in accordance with an aspect of the present invention.

FIG. 1 shows a functional view of a system 10 in accordance with an aspect of the invention that includes the data plane 12, the entropy plane 14 and the control plane 16, in which N communication endpoints 18 are connected to each other and to a control console 20 that manages the acquisition and transfer of random information and controls the key management and synchronization system at each node 22. The encrypted information is communicated via the data plane with each node 22 via an underlying cryptosystem of each node. Each node 22 also includes a management and synchronization system that communicates with the control console via the control plane 16, as well as its own interface and control apparatus. Each module 22 also includes an entropy interface that communicates via the entropy plane 14 with the control console 20, which in turn is in communication with random information sources 24, an in particular, dynamically changing sources of random or pseudo-random information. Each node 22 further is in communication with each communication endpoint 18 via a payload interface.

Figure 2:
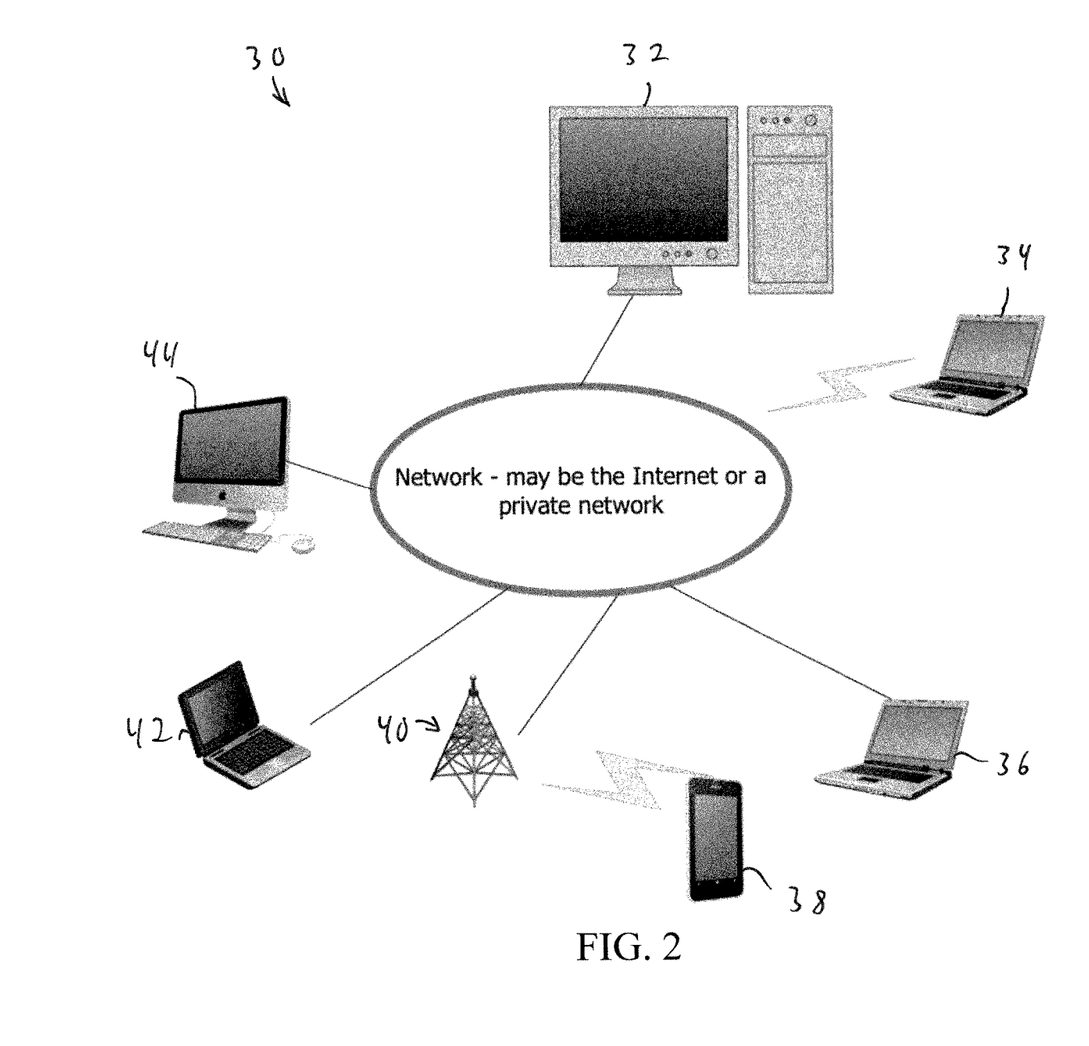
FIG. 2 shows an illustrative diagrammatic network view of a system in accordance with an aspect of the present invention.

A network view of the system is shown at 30 in FIG. 2, which includes any of desktop computers 32, 44 connected to a network 46, laptop devices 36, 42 connected to the network 46 or connected (as shown at 34 as a laptop or personal communication device 38) via anther network such as cellular network 40 to the network 46. The control console (20 of FIG. 1) manages the provisioning, distribution of key material, indexing, synchronization and eventual de-provisioning of various devices on the network, or having access to the network via e.g., the cellular gateway. The network 46 may be the Internet or any local or private network. Clients may securely communicate among themselves once provisioned by the control console.

Each of the multiple communication apparatuses may be connected to a common medium to carry the signaling information, cipher stream and random information, or each of these may be carried by separate logical and/or physical media. In the network view of FIG. 2, heterogeneous devices may all communicate securely. Each communication apparatus is in communication with at least one source of random or pseudo-random information via the common control console 20. Each of the communication paths of the plurality of communication apparatuses include the data plane 12, the entropy plane 14 and the control plane 16.

Figure 3:
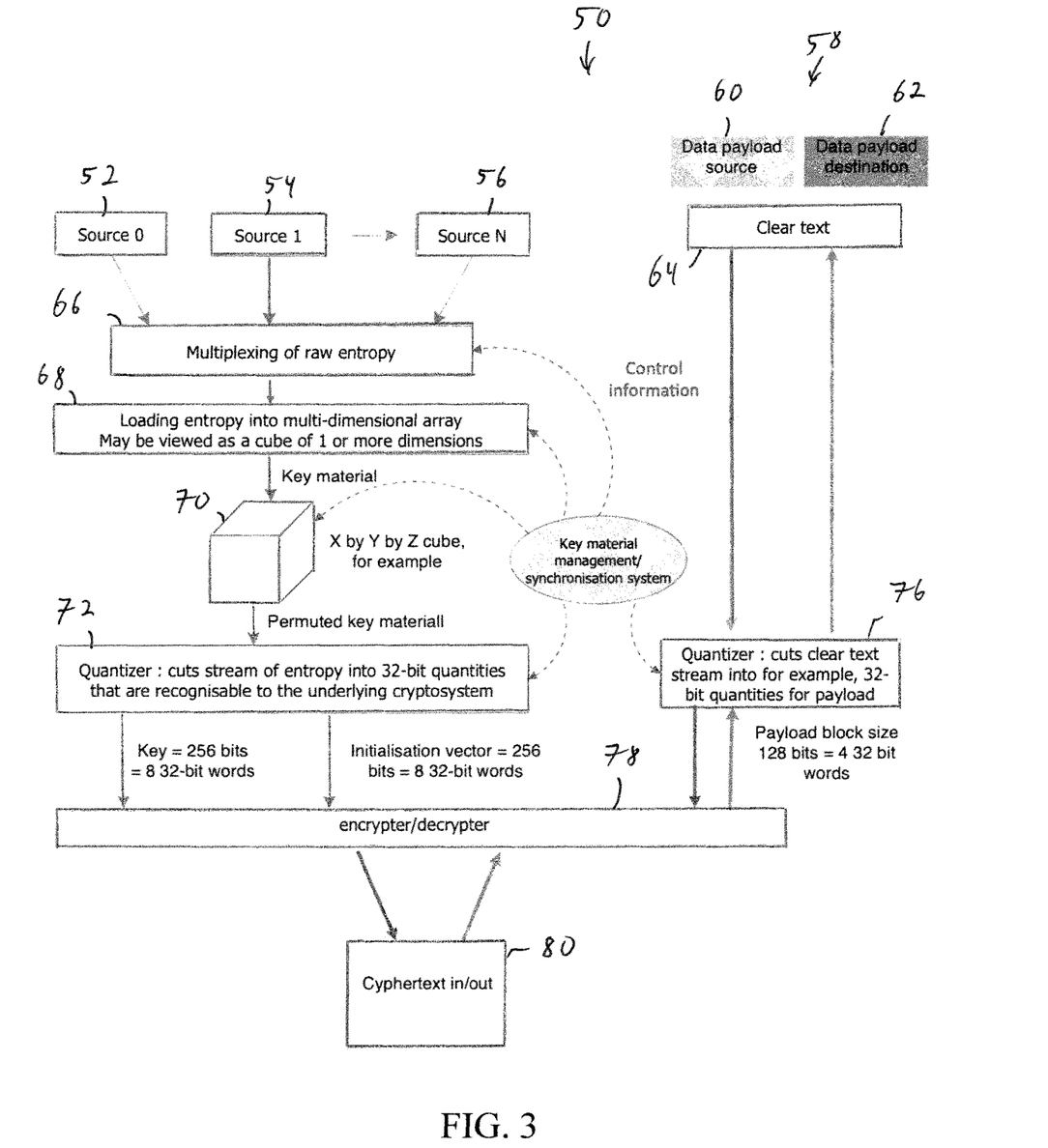
FIG. 3 shows an illustrative diagrammatic view of an information control system in a cryptographic management key system in accordance with an aspect of the present invention.

FIG. 3 shows an information control system 50 in a cryptographic management key system in accordance with an aspect of the present invention. The information control system 50 provides an information control process that involves receiving entropy material from entropy source 52, 54, 56 and is provided to a multiplexing entropy module 66 that provides for multiplexing of the raw entropy material from the entropy sources 52, 54, 56. The entropy sources 52, 54, 56 are, for example, dynamically changing sources of random and pseudo-random information. Data is communicated at 58 from data payload sources 60 and to data payload destinations 62 via a clear text module 64. The output of the multiplexing entropy module 66 is provided to the key material loader 68 that loads entropy source material into a multi-dimensional database 70 that may be viewed as a cube of one or more dimensions. Permeated key material is provided by the database 70 to a key material quantizer 72 that cuts streams of entropy into, for example, 32-bit quantities that are recognizable by the underlying cryptosystem. A key material management/synchronization system 74 is in communication with the multiplexing entropy module 66, the loading entropy module 68, the key material quantizer 72 and a payload data quantizer 76 that receives data from the data payload source 60 via the clear text module 64 and provides data to the data payload destination 62 via the clear text module 64. The key material quantizer 72 and the payload data quantizer 76 communicate with an encrypter/decrypter module 78, which provides encrypted data to and from a cyphertext in/out module 80. In particular, the key material quantizer 72 provides to the encrypter/decrypter module 78 a key of, for example, 256 bits as eight 32-bit words as well as an initialization vector of, for example, 256 bits as eight 32-bit words. The payload data quantizer 76 communicates with the encrypter/decrypter module 78 via payloads of block size, for example, of 128 bits as four 32-bit words.

The apparatus shown in FIG. 3 is symmetric, and therefore the same key material is used in each direction of the communication link. The purpose and operation of each component in FIG. 3 are as follows. The one or more entropy sources 52, 54, 56 provide at least on such source of random information used in the construction of cryptographic keys. The entropy source or sources may be e.g., quantum random number generators (QRNGs) or other sources of random information. The entropy multiplexer 66 combines the random information from more than one entropy sources in a time-division manner, e.g., using fixed or variable 1) bit quantity and 2) sampling periods. The key material loader 68 formats the key material and loads it into the multi-dimensional array 70, which again may be viewed as a cube in three dimensions or other such database. The key material data are loaded in such a way so as to enable the shuffling of its relative position on defined boundaries definable by indexing. The indices may be shuffled as well as the index boundaries. The key material database 70 is the primary data store of key material, which may be shuffled, synchronized and distributed by the key material management and synchronization system.

The key material management and synchronization system 74 performs the distribution of key material databases and periodic distribution of indexing information to the relevant parties among whom secure communication may be initiated, as well as the methods of synchronization among the communicating peers. It may periodically shuffle the index positions in the key material database and distribute such index information to the relevant parties. It goes beyond the prior art by providing control of services as 1) the multiplexing of raw entropy, 2) loading the combined entropy into the multi-dimensional database, 3) controlling the quantization boundaries of the raw permuted key material, controlling the generation (or not) of the initialization vector data and 4) controlling the bit/word boundaries of the payload data to ensure compliance to the transmissible size and formatting requirements of the underlying network.

The key material quantizer 72 receives the permuted key material, as indexed and shuffled by the key material management and synchronization system is then broken down into bitwise quanta that the underlying encryption/decryption system can make use of, comprising for example, 1) a 256-bit key and 2) a 256-bit initialization vector, which ensures that any new data which are encrypted using the same key do not result in the same cyphertext or clear text (in the case of decryption). The payload data quantizer 76 provides that payload data are packed (in the case of encryption) on 128-bit boundaries or unpacked from 128-bit quantities and assembled into data packets that the system components in the subsequent layers understand, e.g., transport layer packets such as Transmission Control Protocol (TCP) or User Datagram Protocol (UDP) packets that may have a payload of 1500 octets. The IP transport layer is used in this example, but the invention may be deployed at other logical positions in the network.

The encryption/decryption module 78 may be implemented in software, firmware, custom hardware Application Specific Integrated Circuits (ASICs) and/or Field Programmable Gate Arrays (FPGA) devices among other types of architecture. It is symmetric, which means that it functions bi-directionally as an encryption and decryption service using the same parameters in both directions. Again, FIG. 3 shows a basic apparatus for implementation of disposable cryptographic keys.

Figure 4:
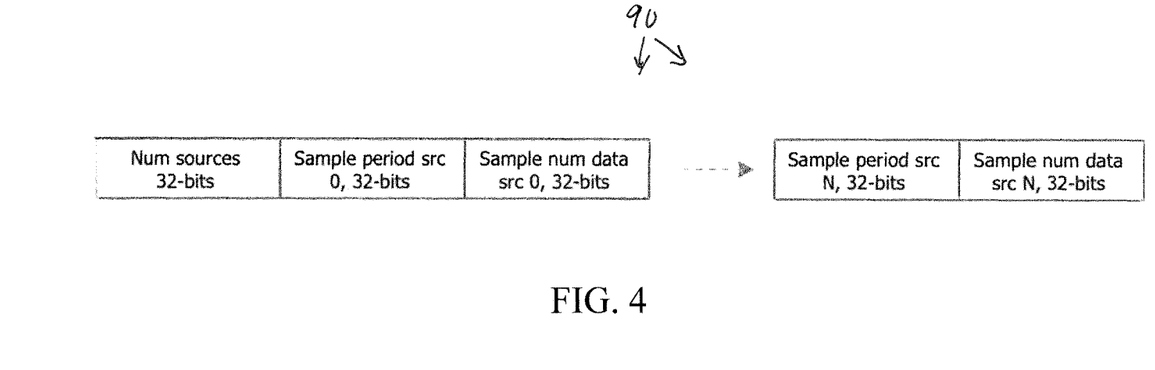
FIG. 4 shows an illustrative diagrammatic view of an entropy multiplexer signaling packet in the system of FIG. 3.

With reference to FIG. 4, the entropy multiplexer receives raw random information from one or more entropy sources. In the case of a single entropy source, no multiplexing occurs, but the multiplexer samples the information from the entropy source for a time period defined by a command from the key material management and synchronization system (KMSS) 74 (of FIG. 3). The KMSS 74 may instruct the multiplexer to sample for 1) a specific period of time, or 2) a specific number of octets of entropy information. If more than one entropy source is present and active, the KMSS 74 shall additionally specify the identifier of each source, as well as the specific period of time over which to sample that source or specific number of octets of entropy to receive from each source. The resulting output shall be a string of octets in a format usable by the key material loader 68 (of FIG. 3) in the manner of FIG. 4.

FIG. 4 shows at 90 an entropy multiplexer signaling packet, which includes the values num sources, sample period src and sample num data. The values num sources represent the total quantity of entropy sources sampled. The values sample period, src 0 through src N represents the sampling period, which may represent seconds, ms, microseconds or other quantities, depending on the implementation. The values sample num data, src 0 through src N represents the number of data to receive from each entropy source, and may represent number of bits, octets, or other quantities, depending on implementation. The above quantities may be expressed, for example, as 32-bit quantities. Although the signaling packet may imply a certain order of entropy sources which to read, the KMSS may construct a hopping-list that specifies the sequence of each entropy source to determine if there are more than one entropy sources.

Figure 5:
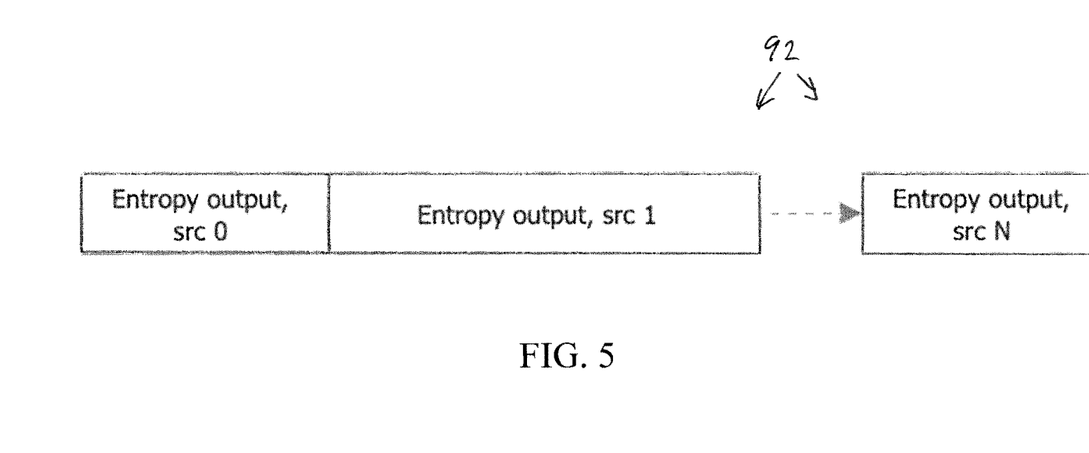
FIG. 5 shows an illustrative diagrammatic view of an entropy multiplexer output packet in the system of FIG. 3.

With reference to FIG. 5, the entropy multiplexor output packet 92 includes entropy output src 0 . . . entropy output src N, which represents the arrangement of entropy to be passed to the key material loader 68. The above quantities may be expressed in a manner that is implementation dependent, such as bits, octets, 32-bit words or otherwise. The order of the output data is instructed by the KMSS and is not necessarily in order from 0 through N. FIG. 5 shows the entropy multiplexer output packet, and FIG. 6 shows the entropy multiplexer process.

Figure 6:
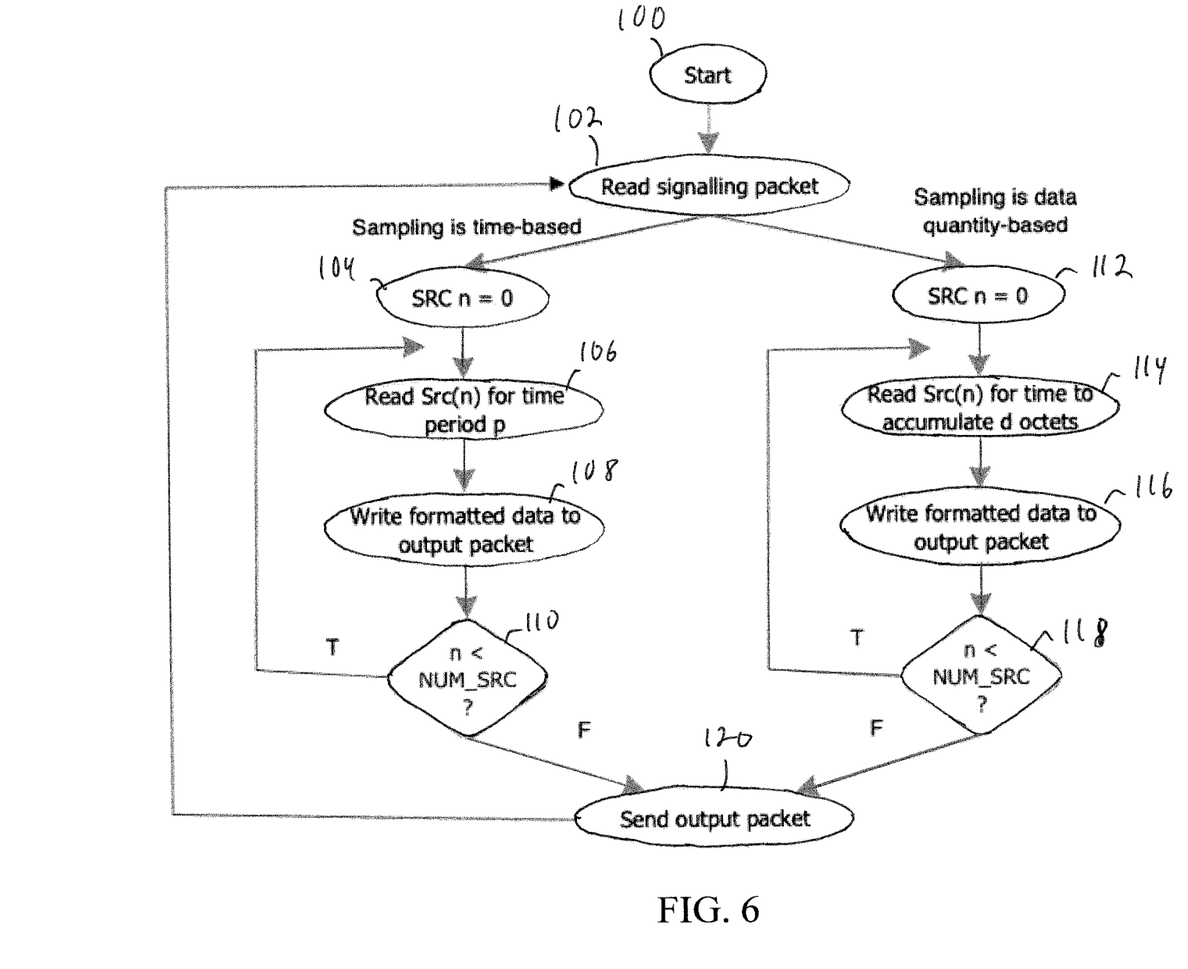
FIG. 6 shows an illustrative diagrammatic view of entropy multiplexer processing steps in an entropy multiplexer in the system of FIG. 3.

With reference to FIG. 6, the process begins (step 100) with the system reading the signaling packet. The signaling packet is read and parameters are scanned. These parameters include Opcode (in data acquisition mode), the number of entropy sources, the sampling period, and the sampling quantity. The signaling packet is then read (step 102), and the sampling may be either time-based or quantity-based. Where the sampling is time-based, the system sets the source count (scr n) equal to zero (step 104), then reads the source (n) for a time period (step 106) and writes formatted data to an output packet (step 108). The process repeats until the upper limit of the count (n) is reached (step 110). Where the sampling is quantity-based, the system sets the source count (scr n) equal to zero (step 112), then reads the source (n) for a time to accumulate a desired set (d) of octets (step 114) and writes formatted data to an output packet (step 116). The process repeats until the upper limit of the count (n) is reached (step 118). Either way, the system then sends the output packet to database 70 (step 120).

The key material loader 68 therefore receives formatted entropy material from the multiplexer and loads it into the key material matrix database 70. This is done under the control of the key material management and synchronization system 74, which may additionally shuffle the indices. The key material loader 68 receives a control packet from the KMSS 74 and performs the operation associated with the received opcode.

The key material database 70 may be viewed as a multi-dimensional cube, or other such entity, where the important feature is that the information in the database may be re-indexed and shuffled. This means that external references to the index shall be able to randomly access any octet, word or other quantity of data and also that the relationship of the data elements may be shuffled, which may mean a partial or complete re-ordering of the information in the database relative to the indices.

Additional functionality of KMSS 74 include the following. The KMSS 74 may be external to all communication endpoints. Its purpose is to coordinate the activities of each network element in the entire system. This includes control of the entropy multiplexer 66, control of the key material loader 68, shuffling of the key material databases indices 70, control of the key material quantizer 72, and control of the payload data quantizer 76. The entropy multiplexer 66 selects the desired number of entropy sources and data acquisition mode. The key material loader 68 sets the data length boundaries for insertion of key material into database. The key material databases indices 70 re-orders of some or all of the key material stored as entropy quanta in the database, which may be done directly, or indirectly by re-ordering the indexing. The key material quantizer 72 controls the formatting of an actual non-reusable i) encryption key and ii) initialization vector, in the format that is consistent to the requirements of the underlying cryptosystem. The payload data quantizer 76 sets the data boundaries in bits or octets for payload data coming in or out of the cryptosystem.

The quantizers manage the packeting of the information. In particular, the key material quantizer 72 formats the entropy from the database into actual keys and initialization vectors, as per the specification of the underlying cryptosystem. For example, each key and each initialization vector may comprise 256 bits. The resulting formatted keys and initialization vectors are subsequently sent to the cryptosystem. The payload data quantizer 76 element sets the boundaries of payload quantity for a given encode or decode operation. In addition, it i) disassembles packets arriving from upper layers of the system stack (e.g., payload area of User Datagram Protocol (UDP) packets) into packets formatted for the underlying cryptosystem specifications and ii) assembles packets arriving from the decryption unit into upper-layer formatted data packets, including the assembly of decrypted payload area and any required clear text headers.

In accordance with various aspects, therefore, the invention provides a secure communication system including a plurality of communication apparatuses under the control of a common control console, one or more sources of random information, sent to each communication apparatus, and connection of all elements by the control plane, random information plane and data plane. The connection among the network elements may be wireline, wireless, etc.

In accordance with other aspects, the invention provides an apparatus for continuous generation of disposable cryptographic keys for an underlying cryptosystem including any of the following elements: one or more sources of raw entropy provide the source of information to generate random information; an entropy multiplexer, which combines entropy from one or more entropy sources; a key material loader, which formats raw key material and loads it into a database; a key material database, which stores entropy information that can be accessed randomly via index positions and its information shuffled relative to any other indexed position in the database; a key material management and synchronization system, which performs as the master controller of the entire system; a key material quantizer, quantizes the raw entropy from the database and formats it into an appropriate cryptographic key; and a payload data quantizer, which formats and unformats payload data to and from the encryption and decryption units.

In such an apparatus the one or more entropy sources may comprise random information generators, implemented in a variety of ways. The one or more entropy sources may comprise one or more databases containing random information. The entropy sources may comprise one or more quantum random number generators. The underlying cryptosystem may be, for example, AES-256, RSA, or ECC.

In accordance with further aspects, the invention provides a method for producing ephemeral, disposable cryptographic keys including, for example, the following steps: selecting one or more sources of random information; multiplexing the random information in a pre-defined or arbitrary manner; formatting the random information for storage in a random-access database; shuffling and/or re-indexing the information in the random-access database relative to its index positions; formatting the shuffled random information from the database to form a i) key and ii) initialization vector; sending the formatted key material to the cryptosystem; selecting the format for upper layer payload data packets; disassembling the payload packet into smaller packets that can be transported by the cryptosystem; and assembling data payload packets arriving from the cryptosystem into decrypted payload packets that are then passed to the upper layers of the system.

In the method, the term cryptosystem may be replaced with specific, difference types of cryptosystems. The upper layer payload packets may refer to Transmission Control Protocol (TCP), User Datagram Protocol (UDP), or other Transport Layer data packets. The upper layer payload packets may refer to any other type of data packet format originating or terminating in any logical layer of the network.

In addition to performing the known functions of the key material management and synchronization system described by the prior art, the system adds 1) the multiplexing of raw entropy which may be generated from more than one source, 2) controlling the quantization boundaries of the raw permuted key material, 3) controlling the generation (or not) of the initialization vector data and 4) controlling the bit/word boundaries of the payload data.

As compared to existing systems using an underlying encryption/decryption method, a temporal element is added to the usage of the permuted key material extracted from the key material database, with the ability to set the periodicity of ephemeral key creation and usage. Keys are never stored, and only created before immediate use. Keys are never exchanged, only the index values are communicated among peers, which are meaningless to intruders. New keys may be manufactured at variable periodicity making them immediately useless to an intruder.

As further compared to existing system using an underlying encryption/decryption method, the synchronization of the indexing of key material database by the key material management and synchronization system among communicating peers eliminates the need for stored keys. Index synchronization means that all the peers know where to start constructing their keys and initialization sequences from the database of permuted key material. Therefore, no keys are stored before, or after their usage.

Systems and methods of various aspects of the present invention therefore are the i) introduction of a temporal component and ii) the fact that the keys are used once, and then discarded. The temporal component provides the ability to continually and rapidly generate sequential cryptographic keys that will be used over a very short period of time, e.g., 100 ms. This means that the information used for one key will never be used for another, identical key and that a random attack is unlikely to succeed, but in the event that it did succeed, there would be an extremely low probability of random attacks succeeding over the entire length of the message. With regard to the disposable keys, the fact that the keys are never used more than once, and furthermore never stored, means that there is no benefit to an attacker, because there is nothing relevant to steal or misuse by an attacker.

Figure 7:
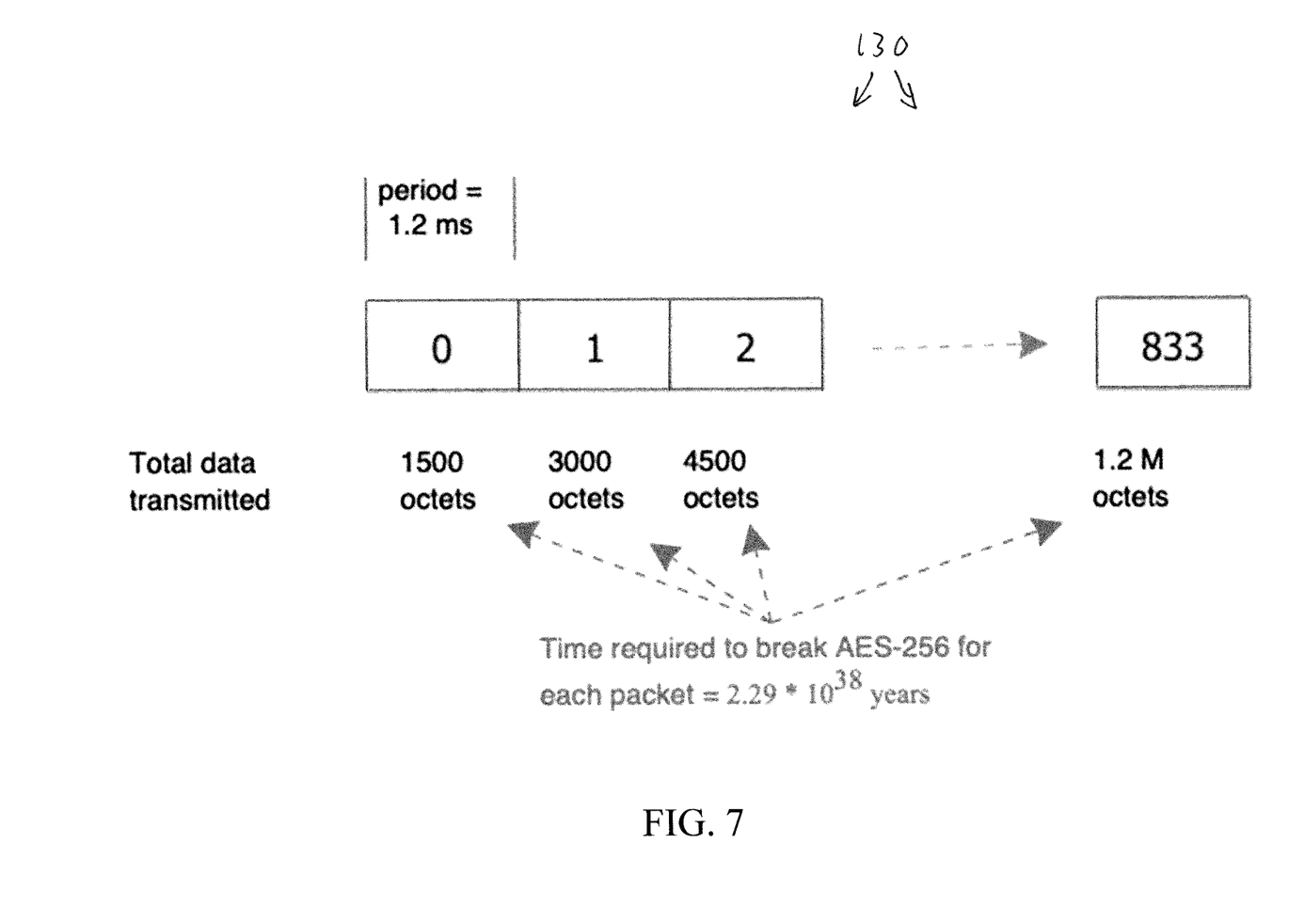
FIG. 7 shows an illustrative diagrammatic view of key changes per octet data packet periods in the system of FIG. 3.

With reference to FIG. 7, a key may be changed every packet period (e.g., every 1.2 ms), which equates to the transmission of 1500 octets of information including all communication headers in accordance with an aspect of the invention. A transmission of a first, second, third, and final octet is shown diagrammatically at 130 in FIG. 7. Assume for example, that there is a communication link capable of interchanging 10 Mbits/sec=1.25 Moctets/second, and that the payload plus all communications headers=1500 octets. This means that in one second, the system can transmit 833 UDP packets. Now, for simplicity, assume that entire message is sent in one second, for a total of 1500*833=1.25 Moctets including all communication headers. This also means that the period to send one packet is 1.2 ms. Also assume that the system is using AES-256 as an underlying cryptosystem and that it requires a modern supercomputer to successfully attack each 1500 octet data packet. The time required therefore for an attacker to successfully decode all 833 data packets would be the sum of the time to decode a single one, because each 1500 octets of data are sent with a different key, or p<833:

$$T_d = \sum_{p=0}^{p=833} 2.29*10^{38} = 1.91*10^{41} \text{ Years}$$

So even if an attacker was fortunate to randomly guess an attack on one 1500 octet quantity of encrypted information, it would require 833 periods−1, making p=832

$$T_d = \sum_{p=0}^{p=832} 2.29*10^{38} = 1.90*10^{41} \text{ Years}$$

to decode the remaining data in the entire message, because each 1500 octet quantity would require $2.29*10^{38}$ years to brute force attack. So, in one second of information transfer, the key has changed 833 times. This simple analysis reflects only the case of having the ability to decode all elements in the 833 periods. In reality, an attacker could learn something useful from partial decode of the message, although this would remain difficult.

In addition to the temporal element of rapidly changing keys, the fact that the keys are never stored and only used one time means that stealing useful keys is impossible, as there is nothing useful to steal because both (or all) endpoints have synchronized on the index of their respective (or central) databases containing key material.

Those skilled in the art will appreciate that numerous modifications and variations may be made to the above disclosed embodiments without departing from the spirit and scope of the present invention.

What is claimed is:

1. A cryptographic key management system for providing secure communication in a cryptographic system, said cryptographic key management system comprising:
a plurality of communication apparatuses under the control of a common control console, each communication apparatus being in communication with at least one source of dynamic random or pseudo-random information via the common control console; and
communication paths among the plurality of communication apparatuses, said communication paths including a control plane, an entropy plane and a data plane, the entropy plane being in communication with a multi-dimensional storage array of the control console, the multi-dimensional storage array for storing source entropy data that is indexed in discrete quantities, each discrete quantity being stored for single use, the common control console providing the stored entropy data from the multi-dimensional storage array to the plurality of communication apparatuses using the entropy plane, the data plane providing secure communication in the cryptographic system using stored entropy data from the multi-dimensional storage array.

2. The cryptographic key management system of claim 1, wherein the at least one source of dynamic random or pseudo-random information comprises random information generators.

3. The cryptographic key management system of claim 2, wherein the at least one source of dynamic random or pseudo-random information comprise random information generators include any of quantum random number generators and algorithmic random number generators and naturally chaotic non-linear random number generators.

4. The cryptographic key management system of claim 1, wherein the at least one source of dynamic random or pseudo-random information comprises one or more databases containing random information.

5. The cryptographic key management system of claim 1, wherein the at least one source of dynamic random or pseudo-random information comprises one or more quantum random number generators.

6. The cryptographic key management system of claim 1, wherein the underlying cryptographic system is advanced encryption standard (AES).

7. The cryptographic key management system of claim 1, wherein the cryptographic system is Rivest-Shamir-Adelman (RSA).

8. The cryptographic key management system of claim 1, wherein the cryptographic system is elliptical curve cryptography (ECC).

9. A key management system for continuous generation of disposable cryptographic keys for an underlying cryptographic system, said key management system comprising:
at least one entropy source of raw entropy that provides the source of information to generate random information or pseudo-random information;
an entropy multiplexer that combines raw entropy from the at least one entropy source;
a key material loader that formats raw key material;
a key material database that receives the raw entropy from the key material loader and stores the raw entropy in discrete indexed quantities so that each indexed quantity can be accessed randomly via index positions and is information shuffled relative to any other indexed position in the database; and a key material management and synchronization system that performs as a system controller of a network system to distribute to the raw entropy data for continuous generation of disposable cryptographic keys for the underlying cryptographic system.

10. The key management system of claim 9, wherein the at least one entropy source comprises a random information generator.

11. The key management system of claim 10, wherein the at least one entropy source comprises random information generators including any of quantum random number generators and algorithmic random number generators and naturally chaotic non-linear random number generators.

12. The key management system of claim 9, wherein the at least one entropy source may comprise one or more databases containing random information.

13. The key management system of claim 9, wherein the at least one entropy source may comprise one or more quantum random number generators.

14. The key management system of claim 9, wherein the underlying cryptographic system is advanced encryption standard (AES).

15. The key management system of claim 9, wherein the underlying cryptographic system is Rivest-Shamir-Adelman (RSA).

16. The key management system of claim 9, wherein the underlying cryptographic system is elliptical curve cryptography (ECC).

17. A method for producing ephemeral, disposable cryptographic keys in an underlying cryptographic system, said method comprising:

selecting one or more sources of random information or pseudo-random information;

multiplexing the random information or pseudo-random information in a pre-defined or arbitrary manner;

formatting the random information or pseudo-random information for storage in a random access database;

shuffling and/or re-indexing the information in the random-access database relative to its index positions;

formatting the shuffled random information from the database to form an ephemeral, disposable cryptographic key and an initialization vector;

sending the formatted ephemeral, disposable cryptographic key and the initialization vector to the underlying cryptographic system;

selecting the format for upper layer payload data packets;

disassembling the upper layer payload data packets into sub-packets that are transported by the underlying cryptographic system; and assembling the sub-packets arriving from the underlying cryptographic system into decrypted payload packets that are then passed to the upper layer payload data packets.

18. The method of claim 17, wherein the underlying cryptographic system is advanced encryption standard (AES).

19. The method of claim 17, wherein the underlying cryptographic system is Rivest-Shamir-Adelman (RSA).

20. The method of claim 17, wherein the underlying cryptographic system is elliptical curve cryptography (ECC).

21. The method of claim 17, wherein the upper layer payload packets may refer to Transmission Control Protocol (TCP), User Datagram Protocol (UDP), or other Transport Layer data packets.

22. The method of claim 17, wherein the upper layer payload packets may refer to any other type of data packet format originating or terminating in any logical layer of the network.

* * * * *